(12) United States Patent
Masson et al.

(10) Patent No.: US 9,834,474 B2
(45) Date of Patent: Dec. 5, 2017

(54) GLASS FIBRE SIZING COMPOSITION

(75) Inventors: Nadia Masson, Battice (BE); Luc Peters, Battice (BE); Willy Piret, Battice (BE)

(73) Assignee: 3B-FIBERGLASS SPRL, Battice (BE)

( * ) Notice: Subject to any disclaimer, the term of this patent is extended or adjusted under 35 U.S.C. 154(b) by 813 days.

(21) Appl. No.: 14/129,515

(22) PCT Filed: Jun. 25, 2012

(86) PCT No.: PCT/EP2012/062229
§ 371 (c)(1),
(2), (4) Date: Sep. 3, 2014

(87) PCT Pub. No.: WO2013/000863
PCT Pub. Date: Jan. 3, 2013

(65) Prior Publication Data
US 2014/0370266 A1    Dec. 18, 2014

(30) Foreign Application Priority Data

Jun. 28, 2011 (EP) .................................... 11171653

(51) Int. Cl.
*C03C 25/40* (2006.01)
*C03C 25/26* (2006.01)
(Continued)

(52) U.S. Cl.
CPC .............. *C03C 25/40* (2013.01); *C03C 25/26* (2013.01); *C03C 25/36* (2013.01); *C08J 5/08* (2013.01);
(Continued)

(58) Field of Classification Search
CPC ... C09J 5/08; C09J 5/24; C09J 2483/00; C09J 5/02; C08K 9/06; C08K 7/14;
(Continued)

(56) References Cited

U.S. PATENT DOCUMENTS

| 3,249,411 A | 5/1966 | McWilliams et al. |
| 3,317,369 A * | 5/1967 | Clark ............... C03C 25/40 |
| | | 273/DIG. 29 |
| 2006/0204763 A1 | 9/2006 | Hartman et al. |

FOREIGN PATENT DOCUMENTS

| EP | 2053078 A1 | 4/2009 |
| FR | 2872508 A1 | 1/2006 |

(Continued)

OTHER PUBLICATIONS

Park J M et al. "Interfacial Shear Strength and Durability Improvement by Monomeric and Polymeric Silanes in Basalt Fiber/Epoxy Single-Filament Composite Specimens", Journal of Adhesion Science and Technology, Zeist, NL. vol. 5, No. 6, Jan. 1, 1991, pp. 459-477.

*Primary Examiner* — Camie Thompson
(74) *Attorney, Agent, or Firm* — Avery N. Goldstein; Blue Filament Law PLLC

(57) ABSTRACT

The present invention concerns a sizing composition for glass fibers comprising the following components: (a) A silane based coupling agent which is not an aminosilane; (b) A film former; (c) A borate; (d) A lubricant Characterized in that, at least 75 wt. % of the silane coupling agent present in the composition is dialkoxylated. It also concerns a glass fiber sized with the reaction product of said sizing composition, as well as a polymeric composite reinforced with such glass fibers.

16 Claims, 2 Drawing Sheets

(51) Int. Cl.
  *C03C 25/36* (2006.01)
  *C08J 5/08* (2006.01)
  *C08J 5/24* (2006.01)
  *C08K 7/14* (2006.01)
  *C08K 9/06* (2006.01)
  *C08K 5/5419* (2006.01)

(52) U.S. Cl.
  CPC ..................................... *C08J 5/24* (2013.01); *C08K 7/14* (2013.01); *C08K 9/06* (2013.01); *C08K 5/5419* (2013.01); *Y10T 428/249924* (2015.04); *Y10T 428/249944* (2015.04); *Y10T 428/249948* (2015.04); *Y10T 428/2916* (2015.01)

(58) Field of Classification Search
  CPC ......... C08K 5/5419; Y10T 428/249944; Y10T 428/2916; Y10T 428/249948; C09D 4/00; C09D 183/06; C09D 183/08; C08G 77/04; C08L 83/16; C09K 2200/0494; C03C 25/36; C03C 25/40; C08J 5/08; C08J 5/24
  USPC ........ 428/298.7, 300.1, 366; 427/387, 407.2, 427/410; 523/445
  See application file for complete search history.

(56) References Cited

FOREIGN PATENT DOCUMENTS

WO 2004110948 A1 12/2004
WO 2006007169 A1 1/2006

\* cited by examiner

GLASS FIBRE SIZING COMPOSITION

RELATED APPLICATIONS

This application is a non-provisional US national phase utility application that claims priority benefit to Patent Cooperation Treaty application PCT/EP2012/062229 filed 25 Jun. 2012; that in turn claims priority benefit of European application No. 11171653.6 filed 28 Jun. 2011; these applications are hereby incorporated by reference.

TECHNICAL FIELD

The present invention relates to the field of glass fibre reinforced composites and, in particular, of silane based sizings for glass fibres enhancing the mechanical properties of polymeric composites reinforced with glass fibres coated with such sizing.

BACKGROUND FOR THE INVENTION

Polymeric materials have many attractive properties, but their mechanical properties are insufficient for many structural applications. Fibre reinforced composites, wherein approximately 6 to 25 μm diameter fibres having high stiffness and/or strength, typically carbon, glass or aramide fibres, are embedded in a polymeric matrix have substantially higher mechanical properties allowing to reach very advantageous mechanical properties to density ratios. The reinforcing fibres may be short, long or continuous. In the latter case, the continuous fibres can be oriented differently depending on the stress field a particular part is to be submitted to. The reinforcing fibres may be arranged in a fabric form, such as weaves of different patterns, braids, or knits, or they can be laid in a mould or filament wound following a predetermined pattern.

When a fibre reinforced composite is submitted to a stress field, the stress is transferred from the matrix to the fibres through the matrix-fibre interface. If the latter is strong, the whole load is transferred to the fibre and the mechanical properties are high. If, on the other hand, the interfacial bond between matrix and fibres is low, a crack may initiate at and propagate along the fibre-matrix interface resulting in an premature failure. It Is therefore very important to enhance the bond between matrix and fibres.

In order to allow handling of the fibres, typically in a loom, and to enhance interfacial adhesion with the matrix they are embedded in, the fibres are coated with a sizing which composition depends on the nature of the reinforcing fibre to be sized and on the matrix the fibres are to be used with. Glass fibres are usually sized with a silane based composition since Si—O—Si covalent bonds can be formed between, on the one hand, the glass fibre surface and silanols obtained by hydrolysing of the alkoxysilanes of the sizing and, on the other hand, between adjacent silanol groups, thus forming a crosslinked structure at the surface of the glass fibres. This crosslinked structure seems to enhance the fibre resistance to corrosion, typically to hydrolysis. Adhesion of the sizing with the matrix is enhanced by the organic function of the silane coupling agent and by a film former, which nature depends on the matrix used. Sizing compositions usually comprise other additive such as a lubricant, antistatic agents, and the like. Numerous sizing compositions for glass fibres have been proposed in the art, as e.g., in WO2006007169, US2006204763, EP2053078, or WO2004110948 and are reviewed in *E. P. Pluedemann, "Silane Coupling Agents", Plenium Press* (1982).

When monomeric alkoxysilanes or oligomeric polyalkoxysiloxanes with not more than ten units are usually used in sizing compositions for glass fibres, Park and Subramnian suggests in *J. Adhesion Sci. Technol.*, 5 (6), 459 (1991) to use polymeric silanes in which pendant chains of siloxanes are attached through methylene chain spacers to a polyethyleneimine backbone. They suggest that a sawhorse structure is formed at the surface of the fibres, wherein two adjacent Si—O—Si groups between the silane polymer and the glass surface are linked by the polymeric backbone. They concluded that better results were obtained with dialkoxysilanes as side chains of the polymeric backbone, than with trialkoxysilanes. These conclusions were based on interfacial shear strength tests (IFSS) carried out on a single fibre embedded in a resin. Conclusions based on such test results cannot be generalized as such to actual composite materials, because in the latter the reinforcing fibres are packed into bundles of fibres which behave quite differently than individually embedded fibres.

One recurrent difficulty with continuous fibre reinforced composites is that the fibres are arranged in rather closely packed bundles of typically 800 to 8000 individual filaments (30 to 10,000 tex depending on the filament diameter of the order of 9 to 25 μm), which are difficult to penetrate in and percolate through by a liquid polymeric matrix, either a thermosetting resin precursor composition or a thermoplastic melt. The mechanical properties of a given composite (i.e., for a given matrix, fibre type, content and orientation) are dependent inter alia on the interfacial strength and the interfacial area. The former is enhanced by an appropriate sizing as discussed supra, and the latter depends on the ability of the liquid matrix to wet each individual fibre even within densely packed bundles. A poor wetting of the fibres by the matrix have particularly negative effects on the tensile strength in a direction normal to the fibre orientation (=90° tensile as defined in ISO 527/1), on shear strength (as best characterized with the so called short beam test (SBT) as defined in ISO 14130) and in particular in fatigue wherein failure at a stress substantially lower than the breaking point of a composite occurs after a number of load/unload cycles, which is a major source of failures in applications such as wind turbine, leafsprings, boat hulls and the like.

In spite of many developments in the field of sizing compositions for glass fibres, it remains a challenge to further optimize the load transfer from a polymeric matrix to the reinforcing fibres to approach the full mechanical potential of composite materials. The present invention proposes a solution towards this goal. This and other advantages of the present invention are presented in the following.

SUMMARY OF THE INVENTION

The present invention is defined in the appended independent claims. Preferred embodiments are defined in the dependent claims. In particular, the present invention concerns a sizing composition for glass fibres comprising the following components:

(a) A silane based coupling agent comprising monomeric siloxane or oligomeric polysiloxane of not more than 10 units, preferably not more than 6 units;
(b) A film former;
(c) A borate;
(d) A lubricant wherein at least 75 wt. % of the silane present in the composition is dialkoxylated and is not an aminosilane. In a preferred embodiment, at least 80 wt. %, preferably at least 90 wt. %; more preferably at least 95 wt. %, most preferably at least 99 wt. % of the silane present in the composition is dialkoxylated and the remaining silane is trialkoxylated. A dialkoxylated silane is meant herein to be a silane of the type $R^1R^2Si(OR^3)(OR^4)$, wherein $R^2$ to $R^4$ are same or different groups comprising no amine group, preferably C1 to C5-alkyl groups, such as methyl, ethyl, propyl groups, and $R^1$ is an amino-free organic group, preferably comprising moieties reactive with the polymeric matrix the sized glass fibres are intended to reinforce. In other terms it is a silane having two hydrolizable alkoxy groups attached directly to the Si atom. Similarly, a trialkoxylated silane refers to a silane of the type $R^1Si(OR^2)(OR^3)(OR^4)$, wherein $R^1$ to $R^4$ are as defined supra, with the exception that they may comprise amino groups, although it is preferred that they comprise no amino-group. It is preferred that the whole silane comprised in the sizing composition be dialkoxylated. The silane is preferably present in the composition in an amount comprised between 2 and 20 wt. % of the total active composition, preferably between 4 and 15 wt. %, more preferably between 8 and 14 wt. %. Suitable dialkoxylated silanes are dimethoxysilanes or diethoxysilanes, preferably glycidoxypropyl-methyl-dimethoxysilane or glycidoxypropyl-methyl-diethoxysilane.

The nature of the film former depends on the matrix the glass fibres are to reinforce. In particular, it is preferred that the film former be selected among the group of epoxy resins and polyester resins. The film former is preferably present in an amount comprised between 40 and 80 wt. %; preferably between 50 and 70 wt. % with respect to the total weight of the active composition. The "total weight of the active composition" means the total weight of components excluding the weight of water or other solvent used to solubilise or emulsify the composition and excluding hydrolysis volatile by-products.

In a preferred embodiment, the borate is selected from the group of boron oxide, sodium tetraborate, potassium metaborate, potassium tetraborate, ammonium biborate, ammonium tetrafluoroborate, butylammonium tetrafluoroborate, calcium tetrafluoroborate, lithium fluoroborate, potassium tetrafluoroborate, sodium tetrafluoroborate, tetrabutylammonium tetrafluoroborate, tetraethylammonium tetrafluoroborate, and zinc tetrafluoroborate. Ammonium tetrafluoroborate is most preferred. The borate is preferably present in an amount comprised between 0.2 and 8 wt. % with respect to the total weight of the active composition, preferably 0.5 and 5 wt. % more preferably between 1 and 5 wt. %. Borates are believed to catalyze the condensation of the silane on glass and, during impregnation of the fibres by a resin, to catalyze curing of said resin, in particular epoxy resins.

The lubricant can be any lubricant commonly used in sizings for glass fibres. In particular, the lubricant can be a polyethylene glycol ester. It is preferably present in an amount comprised between 5 and 30 wt. % with respect to the total weight of the active composition, preferably between 10 and 25 wt. %, more preferably between 15 and 22 wt. %.

The present invention also concerns a glass fibre for reinforcement of composite materials comprising as sizing coated on the surface thereof the reaction product of a composition as defined above. To enhance percolation of a resin between the fibres within a bundle, it is preferred that the sizing have a solubility measured by Soxhlet extraction in Toluene comprised between 50 and 90%.

The present invention also concerns a composite material comprising a matrix reinforced with glass fibres as defined supra. Any matrix can of course be used. In particular, the matrix can be a thermoset resin, prefeably epoxy, unsaturated polyester, vinylester, polyurethane, or a thermoplastic polymer, preferably polypropylene (PP), polybutylene terephtalate (PBT), polyethylene terephtalate (PET), polyetheretherketone (PEEK), polyetherimide (PEI), linear polyurethane (PU), polystyrene and copolymers and terpolymers thereof.

The mechanical properties of a composite material reinforced with glass fibres sized with a sizing as discussed supra yield superior mechanical properties than prior art glass fibre reinforced composites. In particular, tests have shown that composites according to the present invention comprising 63 vol. % glass fibres arranged unidirectionally (=UD), may have a resistance to short beam testing according ISO 14130 of at least 65 MPa, preferably at least 68 MPa, more preferably at least 70 MPa. The same composite may have a tensile strength at 90° according ISO 527/1 of at least 40 MPa, preferably at least 50 MPa, more preferably at least 55 MPa. Finally, their fatigue resistance as defined in ISO13003:2003 to 0° tensile strain of 0.12% to 1.2% of at least 50,000 cycles, preferably at least 100,000 cycles, more preferably at least 120,000 cycles, most preferably at least 150,000 cycles.

All three foregoing mechanical properties are very severe on fibre reinforced composites and the excellent results yielded with the composites of the present invention make them particularly suitable for use in advanced composite applications in various fields of technology. In particular, the composites of the present invention can be advantageously used in the field of energy, for wind turbines, wave and tidal energy converters and the like. In transportation, many applications are possible, such as lightweight leafsprings in automotive vehicles, pressure vessels, e.g., for hydrogen or methane storage, hydraulic systems and fuselage and wing structural parts in airplanes, hulls for ships, and the like. Sports is another field where applications are infinite such as bicycle frames and components, golf clubs, sticks for ice and field hockey, hurling and the like, and rackets for badminton, tennis, squash, and the like.

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

Figure 1:
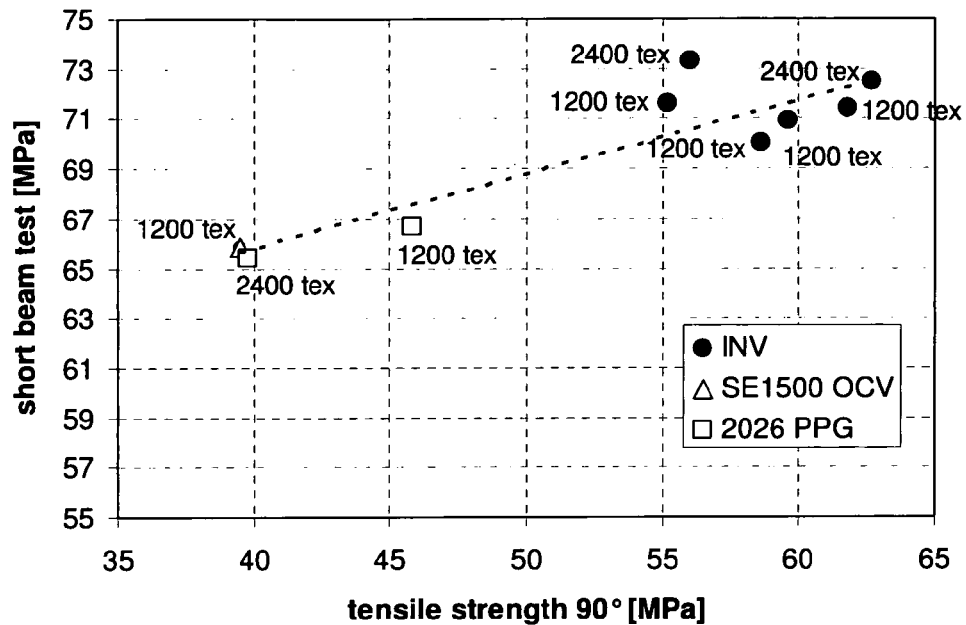
FIG. 1: shows a graph of the tensile strength at 90° vs SBT on UD glass fibre reinforced composites of the prior art and according to the present invention.

The present invention proposes a totally innovative form of silane based sizing for glass fibres for use as reinforcement in composite materials yielding superior properties with respect to the glass fibres presently available in the market. When about all silane based sizings are designed to react, on the one hand, with the surface of the glass fibres and, on the other hand, with each other so as to form a crosslinked net around the fibres, the present invention departs completely from this approach and reduces substantially, or even eliminates altogether, the crosslinking reactions between neighbouring silane chains. This is achieved by using mostly dialkoxylated silanes instead of trialkoxylated silanes as in the prior art.

The alkoxy groups of an alkoxysilane hydrolyze into hydroxyl groups when contacted with an aqueous medium to form a silanol. When applied into contact with the surface of a glass fibre, the hydroxyl groups of the silanol coupling agent condensate on the surface of the glass. Trialkoxysilanes will also react with neighbouring trialkoxysilanes to form a —Si—O—Si— network. Dialkoxysilanes as used in the present invention, cannot form an extensive crosslinking network with neighbouring dialkoxysilanes and will extend linearly from the surface of a glass fibre like as many hairs. The degree of interchains crosslinking between neighbouring silanols can be estimated by measurement of the solubility of the sizing. The weight of a sized glass fibre is measured before, $m_0$, and after, $m_1$, Soxhlet extraction with toluene. The solubility is expressed in % as $(m_0-m_1)/m_0$. It is preferred in the frame of the present invention that the solubility in toluene be comprised between 50 and 98%, preferably between 70 and 95%.

It is estimated that in order to yield the advantageous effects of the present invention, the silane coupling agent must comprise at least 75 wt. % of dialkoxylated silane coupling agent, the rest being trialkoxylated silanes. Preferably at least 80 wt. %, preferably at least 90 wt. %; more preferably at least 95 wt. %, most preferably at least 99 wt. % of the silane coupling agent should be dialkoxylated. Excellent properties are also obtained with a sizing composition comprising solely dialkoxysilane and no trialkoxysilane.

The dialkoxysilane and, if any is present, the trialkoxysilane suitable for the present invention should be monomeric alkoxysilane or oligomeric polysiloxane with not more than 10 units, preferably not more than 6 units. A polysiloxane is defined herein as a short chain comprising in the backbone a number of repeating alkoxysilane units. They differ from the polymeric silanes studied by Park and Subramanian (Op.Cit.) in which pendant chains of siloxanes are attached through alkylene chain spacers to a polyethyleneimine backbone. Although the results of Park and Subramanian show enhanced IFSS results measured on single fibre composite samples with glass fibres coated with a sizing comprising polymeric silanes comprising dialkoxysilane side chains compared with monomeric trialkoxysilane as well as polymeric silanes comprising trialkoxysilane side chains, it appears that these results do not reproduce on composite samples reinforced by fibre bundles. It is believed, without wishing to be bound by any theory, that the use of long backbone chains comprising several alkoxysilane side chains increases the probability of having condensation reactions between polymeric silanes fixed to neighbouring fibres, which is highly detrimental to the impregnation of the fibre bundles by the flowing matrix.

Preferred dialkoxysilanes are dimethoxysilanes, diethoxysilanes, and ethoxy-methoxysilanes. The dialkoxysilanes may be silane esters, vinyl silanes, epoxysilanes, isocyanate silanes, but not aminosilanes, as the amino groups trigger crosslinking with neighbouring hydroxyl-groups and reduce solubility. The amine group can also react with the epoxy functions from the film former and so further reduce the solubility Examples of suitable dialkoxysilanes are glycidoxypropyl-methyl-dimethoxysilane, glycidoxypropyl-methyl-diethoxysilane, vinyltris (2-methoxy-ethoxy)silane, vinyl methyldimethoxysilane, methacryloxypropyl-methyl-dimethoxysilane, methacryloxypropyl-methyl-diethoxysilane, 3-mercaptopropyl methyldimethoxysilane and the like. Such dialkoxysilanes are readily available from the company SHIN ETSU under references KBE402, KBM-502, KBE-502, KBM-802; from the company MOMENTIVE under reference Silquest Wetlink 78 or Coatosil 2287, and A-2171; Trialkoxysilanes, present in less than 25 wt. % of the total amount of silane coupling agent can be selected from the trialkoxysilanes traditionally used in the prior art according to the specific application, in particular depending on the matrix used as matrix of the final composite part. The list of possible trialkoxylated silanes suitable for use with a dialkoxylated silane is too long to note and is well known to the persons skilled in the art, and readily available from the same companies as listed in respect of the dialkoxylated silanes. The trialkoxylated silanes which can be used in a composition according to the present invention, if any are used, may be but are preferably not an aminosilane. The use of a limited amount of trialkoxylated silane in the composition allows to yield a limited amount of —SI—O—Si— crosslinking at the level of the interphase between the surface of the fibres and the coupling agent. In most cases, however, it is preferred to reduce the amount of trialkoxylated silanes to not more than 5 wt. % with respect to the total weight of silanes in the composition, preferably, not more than 2 wt. %, and it is most preferred to include no trialkoxylated silane in the composition.

Aminosilanes are broadly used in sizing compositions for glass fibres because the amino groups present in the molecule act as catalyst to the condensation of silanol groups with the surface of the glass fibres. Since they are part of the silane molecule they are optimally positioned to catalyse the condensation reactions. A first problem with aminosilanes, however, is that they also catalyse condensation of silanol with neighbouring aminosilanes fixed to neighbouring fibres, thus creating a crosslinked network between fibres. A second problem is that, since the amino groups are part of the silane molecule, their content cannot be controlled and is imposed by the molecular structure of the silane. A third disadvantage of aminosilanes is that, once applied to the surface of the glass fibres and condensed, the hydrophilic amino groups remain bound to the interphase between glass fibres and matrix of a composite, rendering said interphase sensitive to moisture and thus reducing resistance to hydrolysis. For these reasons, the dialkoxysilane of the present invention comprises no aminosilane. If a catalyst is required to catalyse condensation of the silanols, it can be added separately, such as for example borates as is discussed in continuation. This has the double advantage that the content thereof can be varied at will and that after condensation, it does not remain bonded to the interphase which would otherwise increase the hydrophilicity as discussed above with respect to the amino groups.

The total amount of silane coupling agent present in the composition is preferably comprised between 2 and 20 wt. % of the total active composition (i.e., excluding water and any hydrolysis volatile byproducts), more preferably between 4 and 15 wt. %, and most preferably between 8 and 14 wt. %. The documents WO2006007169, US2006204763, EP2053078, or WO2004110948 mention punctually dialkoxylated silanes out of rather extensive lists of triakoxylated silanes, but their use is never seriously contemplated, and if so, certainly not in amounts as high as 75 wt. % of the total amount of silanes.

The film former interacts with both the silane coupling agent and the matrix upon impregnation of the fibres. The film former must therefore be compatible with the matrix to be used. A film former protects the glass fibre from damage during processing (e.g., weaving, knitting, braiding, etc.) and promotes compatibility of the fibres with the matrix. It is not necessary that the film former forms any—or at least not extensive—covalent bonds with the silane coupling agent. It is actually preferred that no or little covalent bonds be formed with the silane, so that it can dissolve in the matrix during impregnation of the fibre structure. Traces of film former were identified within the toluene extract of the sizing according to the present invention, suggesting that it remains soluble in the matrix. Preferred film formers comprise epoxy resins, saturated or unsaturated polyester resins, vinyl ester, or phenolic resins. Such film formers are sold as emulsions and are supplied, e.g., by companies like DSM under the trademane Neoxil. The volume average size, $D(v, 0.5)$, of the polymeric film former particles in the emulsion is preferably comprised between 0.05 and 1.5 µm, more preferably not more than 0.2 µm, as can be measured with a Coulter L5230 apparatus. The film former is preferably present in an amount comprised between 40 and 80 wt. %, more preferably between 50 and 70 wt. %, most preferably between 60 and 65 wt. % with respect to the total weight of the active composition (i.e., excluding the weight of the solvent used in the emulsion in which the film former is generally supplied).

The borate is considered as a catalyzer of various reactions. It is first believed to catalyze the hydrolysis of alkoxysilanes necessary to the formation of a covalent bond with the glass fibre surface. Second, it is also believed to catalyse curing reactions of thermosetting matrices during manufacturing of a fibre reinforced composite part. Many types of boron salts can be used in the present invention. They comprise boron oxide, sodium tetraborate, potassium metaborate, potassium tetraborate, ammonium biborate, ammonium tetrafluoroborate, butylammonium tetrafluoroborate, calcium tetrafluoroborate, lithium fluoroborate, potassium tetrafluoroborate, sodium tetrafluoroborate, tetrabutylammonium tetrafluoroborate, tetraethylammonium tetrafluoroborate, and zinc tetrafluoroborate. Ammonium tetrafluoroborate is most preferred. The boron salt is preferably present in an amount comprised between 0.2 and 8 wt. % with respect to the total weight of the active composition, preferably 0.5 and 5 wt. % more preferably between 1 and 5 wt. %, most preferably between 1.2 and 2.5 wt. %.

A lubricant reduces interfilament abrasion and occurrence of fuzz. Its presence is essential for the handling of the fibres. The lubricant may be non-ionic, cationic or anionic. Non-ionic lubricants are preferred. Suitable lubricants (non-ionic) are polyalkylene glycol fatty acids and esters thereof. For example, PEG200, PEG300, PEG400, PEG600 can be used and the esters comprise monooleate, dioleate, monolaurate, dilaurate, monostearate, and distearates. They are available from companies like Cognis, BASF, Oleon, and the like. A preferred lubricant is PEG400 monooleate. The lubricant may be present in an amount comprised between 5 and 30 wt. % with respect to the total weight of the active composition, preferably between 10 and 25 wt. %, more preferably between 15 and 22 wt. %.

All the components discussed supra and any additional additives, such as antistatic agents, colorants, etc. are mixed in water to form an aqueous coupling agent composition. The solid content in water is generally not more than 2 wt. %, in particular, it may be comprised between 0.2 and 2.0 wt. %, preferably between 0.3 and 1.8 wt. % more preferably between 0.4 and 1.7 wt. %. The aqueous composition can be applied to the surface of glass fibres by means well known to the persons skilled in the art, generally by running the fibres drawn out of a bushing onto a coating roll continuously fed with the aqueous coupling agent. The fibres are then gathered into one or several bundles which sizes are only limited by the size of the bushing. A glass fibre bundle for applications in composite materials typically comprises between 800 and 8000 individual filaments. The glass fibre bundle is then wound on a spool and stored in a controlled atmosphere and temperature for drying and for condensation of the silane coupling agent onto the glass fibres surface.

The glass fibre bundle can then be further processed by weaving, braiding, knitting, to form a fabric to be used as reinforcement of composite materials. Several fabric layers may be stacked and then impregnated with a polymeric matrix by technics such as resin transfer moulding (RTM), and the like. In another technique, dry glass fibre fabrics may be preimpregnated by e.g., calendering and individual plies of preimpregnated fibre fabrics (generally unidirectional) may be stacked to form a laminate which can be consolidated by compression moulding, vacuum bagging, autoclave moulding and the like. Alternatively, the glass fibre bundles can be impregnated directly with a polymeric matrix by techniques such as filament winding or pultrusion. Thermoplastic polymeric matrices may require intermediate steps for the impregnation in view of their generally high viscosity such as powder impregnation, fibre commingling, and the like. Some thermoplastic can be polymerized in situ like thermosets, such as in reaction injection moulding (RIM).

Any polymer can be used as matrix for a composite according to the present invention. In particular, the matrix can be a thermoset resin such as an epoxy, an unsaturated polyester, a vinylester, a polyurethane, and the like. Epoxy resins are particularly preferred. Alternatively, the matrix can be a thermoplastic polymer such as polypropylene (PP), polybutylene terephtalate (PBT), polyethylene terephtalate (PET), polyetheretherketone (PEEK), polyetherimide (PEI), linear polyurethane (PU), polycarbonate (PC), polystyrene and copolymers and terpolymers thereof.

Fibre reinforced composite materials are particularly sensitive to three types of mechanicals strains:
(a) tensile strain applied normal to the direction of a fibre, which can be measured by a tensile test on unidirectional fibre reinforced samples applied at 90° with respect to the direction of the fibres as defined in ISO 527/1;
(b) shear strain parallel to a fibre, which can be characterized by a short beam test, which is a three point bending test applied on a particularly short sample and is defined in ISO14130; and
(c) Repetitive strain (fatigue), which can be characterized by a fatigue test as defined in ISO13003:2003, which is a repetitive three point bending or tensile test carried out at a constant strain or constant stress value.

FIG. 1 shows the results of a 90° tensile test plotted versus the results of a short beam test performed on unidirectional fibre reinforced epoxy samples comprising 63 vol. % glass fibres of different types. In all the tests presented herein, the fibres diameter was 17 µm. The samples are obtained by unidirectionally winding a continuous glass fibre roving round a flat plate. The wound fibres are impregnated on both sides of the plate with an epoxy resin with a vacuum resin transfer moulding equipment. The samples for the various tests were then cut out of the two composite plates thus obtained following a predetermined pattern.

The black circles in FIG. 1 correspond to glass fibres sized with a sizing composition according to the present invention as listed in Table 1. Each point is the average of five tests. The various black circles correspond to various drying conditions of the fibres and (tex) titre of the bundles. The white squares correspond to a glass fibre commercialized by PPG and referred to as 2026. One series of samples comprised glass fibre bundles of 2400 tex and the other 1200 tex. The white triangle corresponds to a series of tests carried out on a glass fibre commercialized by OCV and referred to as SE1500. It can be seen that all the glass fibre reinforced composites according to the present invention (black circles) yield substantially higher properties in both 90° tensile test and short beam test than the commercial comparative examples (white squares and white triangle).

Figure 3:
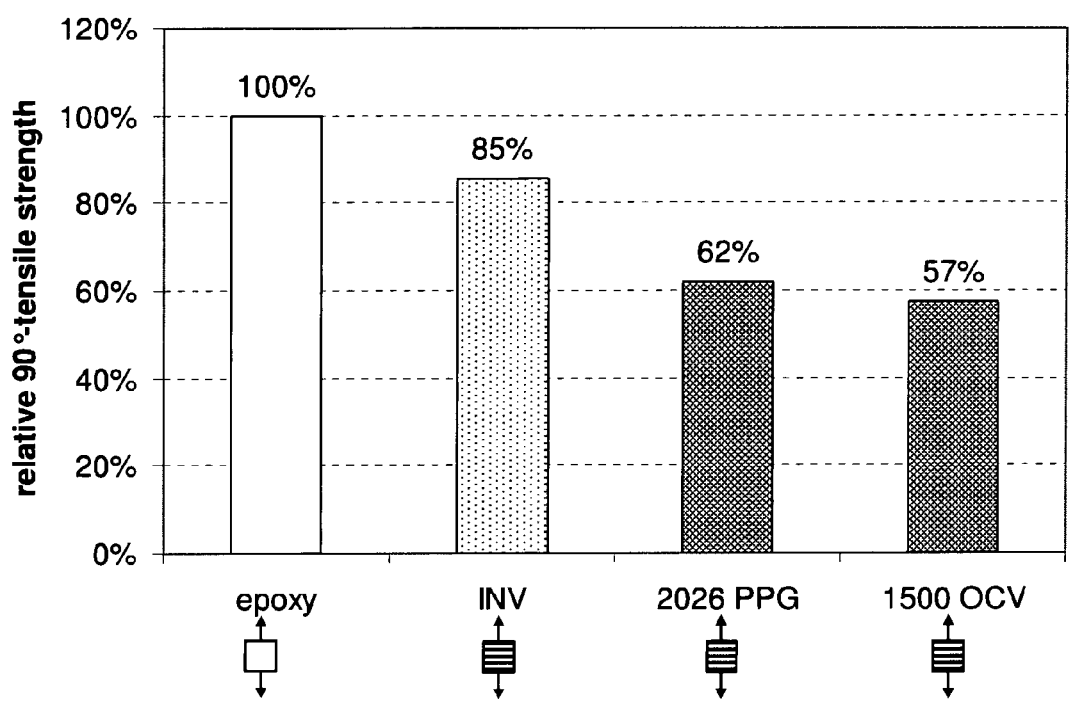
FIG. 3: shows the mean value relative to tensile strength of the epoxy matrix, of the 90° tensile test measured on each type of sizing represented in FIG. 2.

These two tests are quite independent of the glass fibre intrinsic properties such as modulus and strength because the individual fibres are not strained in their longitudinal direction. These tests are used to characterize the interfacial strength between matrix and fibres, which is the product between the adhesive strength per unit area and the interfacial area. The theoretically highest value obtainable in a 90° tensile test is the tensile strength of the matrix, indicating a purely cohesive fracture with no glass-matrix interfacial fracture. FIG. 3 illustrates the relative values of the 90° tensile results plotted in FIG. 1 divided by the tensile strength of 69 MPa measure on the unreinforced epoxy used as matrix. In order to simplify the Figure, the mean value of all the data represented in FIG. 1 for one type of sizing is represented in FIG. 3. For example, all the black circles of the inventive samples represented in FIG. 1 have a mean relative tensile strength value, $\sigma_{90}/\sigma_{epoxy}$=85%±4%. It can be seen in FIG. 3, that the mean value of 85% of the sizing of the present invention is substantially higher than the ones of the comparative sizings, with relative strength values of 62 and 57% only, indicating a mostly interfacial fracture mode. A relative strength of 91% was obtained with the sample corresponding to the upper right black circle of FIG. 1 labelled "2400 tex", suggesting a strong interfacial strength with mostly cohesive fracture of the samples.

Although the exact composition of one of the sizings used in the comparative tests is not known in detail, based on past publications it can safely be concluded that all the comparative sizings differ mostly from the inventive samples in that the coupling agent is based on a trialkoxysilane as is known from the literature instead of dialkoxysilane as the inventive sample (cf. Table 1). The bond between glass fibres and silane coupling agents should theoretically increase with the number of alkoxy-groups linked to a silicon atom of the silane, since three alkoxy groups have a higher probability of interacting and creating a bond with the glass surface than two groups only. On the other hand the borate catalyst promotes the reactivity of the silane with the glass surface and compensates for the lower interaction probability of dialkoxylated silanes. Since the comparative glass fibres are commercialized for use with epoxy, it is also assumed that the bond between matrix and coupling agent is also fairly independent of the alkoxy-functionality of the silane, as they certainly all comprise epoxy groups or amine groups able to react with amines or with epoxy groups, or anhydride from a curable epoxy-hardener composition. Since the adhesive strength per unit area of matrix to the fibres surface seems to be independent of the alkoxy-functionality of the silane, it is assumed, without wishing to be bond by any theory, that the superior properties measured with the samples according to the present invention is due to a higher interfacial area than with the comparative samples. Our interpretation of the superior properties of composites according to the present invention is as follows.

As explained supra, the sizing is applied to individual filaments which are immediately gathered into a bundle of several thousands of filaments before the sizing composition has fully hydrolysed and reacted with the glass fibres. The condensation reaction happen during drying when the filament are tightly packed into a bundle. When traditional sizing compositions based on trialkoxysilane coupling agents are used, the hydrolysed hydroxyl groups of the silanol react with the glass fibre, with the hydroxyl groups of neighbouring silanol chains attached to the same glass fibre, but also with the hydroxyl groups of neighbouring silanol chains attached to a different glass fibre, thus covalently clustering together the individual fibres within a bundle. When a bundle is aligned next to another to yield a unidirectional arrangement, the fibres are not distributed evenly across the cross section in a plane normal to the fibres direction, but are clustered into individual bundles, which are separated by voids. Upon impregnation of the fibres by a resin, the liquid resin follows the path of least resistance, i.e., of highest permeability, which is between bundles, and when the pressure builds up, it percolates between the fibres within the individual bundles. If two adjacent fibres are bond to each other by a —Si—O—Si— bond, the resin will not reach the area of these two glass fibres in the region of the covalent bond. If many interfibre bonds are present within a bundle, it may reduce substantially the fibre area wetted by the resin.

With the sizing composition of the present invention, there is no risk of interfibre —Si—O—Si— bond formation, since only two alkoxy groups per silane chain can be hydrolyzed and allowed to react with the fibres and any hydroxyl group available. This mechanism result in a greater solubility of the sizing as illustrated by the Sohxlet extraction with toluene discussed above. It follows that, when the liquid resin penetrates within the bundle, a substantial amount of the sizing is dissolved within the matrix and the bundles loosen themselves, increasing the interfibre spacing within a bundle and allowing the resin to wet a greater area of the glass fibre surface.

TABLE 1 composition of a sizing composition according to the present invention

| Function | Chemical compound | Tradename | total content wt. % | Active solid wt. % | amount on glass fibre wt. % |
|---|---|---|---|---|---|
| Dialkoxysilane | 3-glycidoxypropylmethyl-diethoxysilane | Coatosil 2287 (Wetlink 78) | 0.82 | 12.12 | 0.0630 |
| Film former | Bis A epoxy EEW230-257 | AD502SR (Birk) | 4.40 | 64.63 | 0.3361 |
| Borate | Ammonium tetrafluoroborate | | 0.10 | 1.51 | 0.0079 |

TABLE 1-continued composition of a sizing composition according to the present invention

| Function | Chemical compound | Tradename | total content wt. % | Active solid wt. % | amount on glass fibre wt. % |
|---|---|---|---|---|---|
| lubricant | PEG400 monooleate | Radiasurf 7403 | 1.38 | 20.23 | 0.1052 |
| Lubricant:antistatic | Polyethyleneimine condensate | Emery 6760L | 0.10 | 1.51 | 0.0079 |
| water | — | — | 93.20 | 0 | |
| Total | | | 100.00 | 100.00 | 0.52 |

Paradoxically, preliminary results suggest that the resistance to corrosion of composites according to the present invention is similar to the one obtained with fibres sized with a trialkoxysilane coupling agent. This is believed to be due to the better wetting of the fibre surface by the resin which shields the fibres from the corrosive agents, like the cross-linked —Si—O—Si— network formed at the surface of the prior art fibres is meant to shield the fibre surface from said corrosive agents.

Figure 2:
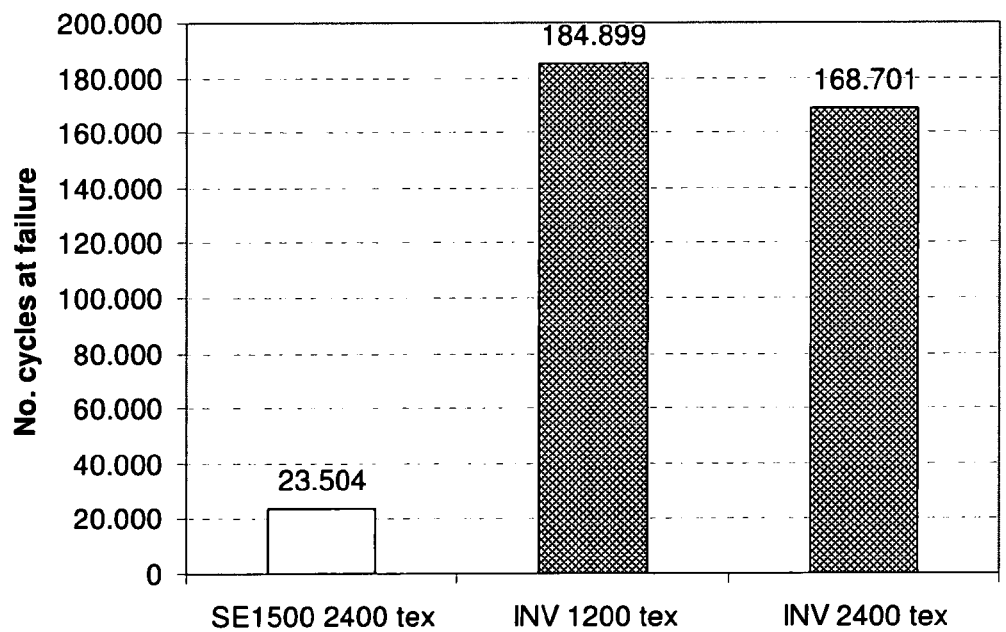
FIG. 2: shows a graph of the number of cycles to failure in 0° tensile mode on UD glass fibre reinforced composites of the prior art and according to the present invention.

FIG. 2 illustrates the results of a fatigue test performed on samples extracted from UD glass fibre reinforced epoxy plates prepared as the ones for the 90°-tensile and short beam tests described supra. Dog bone samples were repeatedly tested in tensile mode at 0° (i.e., parallel to the direction of the fibres) with a strain oscillating between 0.12 and 1.2% at a frequency of 5 Hz. All three samples represented in FIG. 2 broke after a number of cycles at a failure stress comprised between 592 and 615 MPa (each sample being the average of five tests). It can be seen in FIG. 2 that the resistance to fatigue of the samples according to the present invention with a number of cycles before failure of nearly 170,000 to 185,000 cyles, which is more than seven times higher than the one of the commercial comparative sample with less than 24,000 cycles to failure.

Here again, these extraordinary results are attributed to a more thorough wetting of the fibres surface during matrix impregnation which is attributed to the high solubility of the sizing allowing the fibres to separate from one another within a bundle during impregnation, such that the permeability within the bundle is substantially increased. The sizing of the present invention allows to solve one of the recurrent weaknesses of fibre reinforced composite materials with a high resistance to fatigue that makes composite materials according to the present invention particularly suitable for applications exposed to cyclic exposure to stresses and strains. For example, wind turbines and in particular wind turbine blades which can span up to 60 m in length and over are highly solicited in fatigue by their own rotation and the wind speed variations. Similarly all structural components exposed to water current, such as wave and tidal energy converters, boat hulls and the like must have a high resistance to fatigue. In the field of transportation, leafsprings are of course a paradigm of cyclic solicitation. These applications only constitute a non exhaustive list of possible applications for composites according to the present invention. Many other applications are possible and the skilled person will promptly recognize where the superior mechanical properties of the present composites can best be taken advantage of.

The invention claimed is:

1. A sizing composition for glass fibres reinforcements in composite materials, said sizing composition comprising the following components:
    (a) a silane based coupling agent comprising monomeric siloxane or oligomeric polysiloxane of not more than 10 units;
    (b) a film former;
    (c) a borate;
    (d) a lubricant, in that, the silane coupling agent is independent of aminosilane, and in that, at least 75 wt. % of the silane coupling agent present in the composition is dialkoxylated.

2. The sizing composition according to claim 1, wherein at least 80 wt. %, of the silane coupling agent present in the composition is dialkoxylated and the remaining silane is trialkoxylated.

3. The sizing composition according to claim 1, wherein the total amount of silane in the composition is comprised between 2 and 20 wt. % of the total active composition.

4. The sizing composition according to claim 1, wherein the dialkoxylated silane is a dimethoxysilane or diethoxysilane.

5. The sizing composition according to claim 1, wherein the film former is selected among the group of epoxy resins, saturated or unsaturated polyester resins, vinyl ester, or phenolic, and is present in an amount comprised between 40 and 80 wt. %, with respect to the total weight of the active composition.

6. The sizing composition according to claim 1, wherein the borate is selected from the group of boron oxide, sodium tetraborate, potassium metaborate, potassium tetraborate, ammonium biborate, ammonium tetrafluoroborate, butylammonium tetrafluoroborate, calcium tetrafluoroborate, lithium fluoroborate, potassium tetrafluoroborate, sodium tetrafluoroborate, tetrabutylammonium tetrafluoroborate, tetraethylammonium tetrafluoroborate, and zinc tetrafluoroborate, and is present in an amount comprised between 0.2 and 8 wt. % with respect to the total weight of the active composition.

7. The sizing composition according to claim 1, wherein the lubricant is a polyethylene glycol ester, and is present in an amount comprised between 5 and 30 wt. % with respect to the total weight of the active composition.

8. A glass fibre for reinforcement of composite materials comprising:
    a fibre composed of glass and having a surface; and
    a reaction product of the composition according to claim 1 coated on the surface of the fibre.

9. The glass fibre according to claim 8, wherein the sizing has a solubility measured by Soxhlet extraction with toluene comprised between 50 and 98%.

10. A composite material comprising a matrix reinforced with glass fibres according to claim 8.

11. The composite material according to claim 10, wherein the matrix is selected from epoxy, unsaturated polyester, vinylester, polyurethane, polypropylene (PP), polybutylene terephtalate (PBT), polyethylene terephtalate (PET), polyetheretherketone (PEEK), polyetherimide (PEI), linear polyurethane (PU), polycarbonate (PC), polystyrene and copolymers and terpolymers thereof.

12. The composite material according to claim 10, comprising between 60 and 65 vol. % glass fibres arranged unidirectionally, said composite material having a resistance to short beam testing according to ISO14130 of at least 65 MPa.

13. The composite material according to claim 10, comprising between 60 and 65 vol. % glass fibres arranged unidirectionally, said composite material having a tensile strength at 90° according to ISO 527/1 of at least 40 Pa.

14. The composite material according to claim 10, comprising 63 vol. % glass fibres arranged unidirectionally, said composite material having a fatigue resistance as defined in ISO13003:2003 to 0° tensile strain of 0.12% to 1.2% of at least 50,000 cycles.

15. A method of manufacturing of a fibre reinforced composite product including the steps of:
  combining the glass fibres according to claim 8 with a matrix polymer, and
  moulding or filament winding the combined glass fibres and matrix polymer to form the fibre reinforced product in the form of one of: a wind turbine, a windmill blade, wave and tidal energy converters; a leafspring, a pressure vessel, a bicycle, a club, a stick, a racket, or an armoured vehicle.

16. The sizing composition according to claim 1, wherein the dialkoxylated silane is glycidoxypropyl-methyl-dimethoxysilane or glycidoxypropyl-methyl-diethoxysilane.

* * * * *